US011181882B2

(12) United States Patent
Kapila et al.

(10) Patent No.: US 11,181,882 B2
(45) Date of Patent: Nov. 23, 2021

(54) DYNAMIC MODIFICATION OF PRODUCTION PLANS RESPONSIVE TO MANUFACTURING DEVIATIONS

(71) Applicant: THE BOEING COMPANY, Chicago, IL (US)

(72) Inventors: Vivek Kapila, Edmond, OK (US); Stephen Dostert, Daniel Island, SC (US)

(73) Assignee: THE BOEING COMPANY, Chicago, IL (US)

( * ) Notice: Subject to any disclaimer, the term of this patent is extended or adjusted under 35 U.S.C. 154(b) by 62 days.

(21) Appl. No.: 15/627,112

(22) Filed: Jun. 19, 2017

(65) Prior Publication Data

US 2018/0364674 A1 Dec. 20, 2018

(51) Int. Cl.
*G05B 19/27* (2006.01)
*G06Q 50/04* (2012.01)
*G05B 19/00* (2006.01)

(52) U.S. Cl.
CPC ............. *G05B 19/27* (2013.01); *G05B 19/00* (2013.01); *G06Q 50/04* (2013.01); *G05B 2219/35519* (2013.01)

(58) Field of Classification Search
CPC ................... G05B 19/27; G05B 19/00; G05B 2219/35519; G06Q 50/04; G06Q 10/06
USPC ......................................................... 700/186
See application file for complete search history.

(56) References Cited

U.S. PATENT DOCUMENTS

| | | | | |
|---|---|---|---|---|
| 6,528,911 | B1 * | 3/2003 | De Petris | H01H 37/761 257/E23.08 |
| 7,242,995 | B1 | 7/2007 | Morgenson et al. | |
| 7,620,470 | B1 * | 11/2009 | Hickey | G05B 19/4184 700/100 |

(Continued)

FOREIGN PATENT DOCUMENTS

| | | |
|---|---|---|
| EP | 2019371 A1 | 1/2009 |
| EP | 2144197 A1 | 1/2010 |

(Continued)

OTHER PUBLICATIONS

Extended European Search Report for Application No. 18178211.1-1222 dated Aug. 10, 2018.

(Continued)

*Primary Examiner* — Rocio Del Mar Perez-Velez
*Assistant Examiner* — Alicia M. Choi
(74) *Attorney, Agent, or Firm* — Patterson + Sheridan, LLP

(57) ABSTRACT

A computer-implemented method is disclosed that is usable during production of an assembly using at least a first machine tool. The method comprises retrieving a predetermined production plan for the assembly, wherein the predetermined production plan comprises a plurality of operations using the first machine tool; acquiring input data to determine a production deviation from the predetermined production plan; determining, responsive to determining the production deviation, a modified production plan for the assembly by substituting one or more substitute operations for one or more of the plurality of operations of the predetermined production plan; and transmitting instructions to the first machine tool corresponding to the one or more substitute operations of the modified production plan.

20 Claims, 7 Drawing Sheets

(56) References Cited

U.S. PATENT DOCUMENTS

| | | | |
|---|---|---|---|
| 2002/0181760 A1* | 12/2002 | Asai | G01N 21/95692 382/149 |
| 2003/0110142 A1* | 6/2003 | Sesek | G06Q 10/06 705/404 |
| 2003/0150908 A1* | 8/2003 | Pokorny | B23Q 35/12 235/375 |
| 2004/0084520 A1* | 5/2004 | Muehl | G06F 7/00 235/376 |
| 2004/0148212 A1* | 7/2004 | Wu | G06Q 10/06 705/7.12 |
| 2004/0216002 A1* | 10/2004 | Fromherz | G06Q 10/06 714/25 |
| 2005/0075748 A1* | 4/2005 | Gartland | G05B 19/4189 700/108 |
| 2007/0198135 A1* | 8/2007 | Chang | G05B 19/4184 700/300 |
| 2008/0133163 A1* | 6/2008 | Shanmugasundram | B24B 37/013 702/83 |
| 2009/0030661 A1* | 1/2009 | Bouffiou | G05B 19/41865 703/2 |
| 2009/0093902 A1* | 4/2009 | Tiozzo | G06Q 10/06 700/105 |
| 2009/0105864 A1* | 4/2009 | Lloyd | G05B 19/41875 700/110 |
| 2009/0228134 A1* | 9/2009 | Munk | B64F 5/10 700/167 |
| 2010/0010845 A1* | 1/2010 | Kuhn | G06Q 10/0631 705/7.36 |
| 2010/0057240 A1* | 3/2010 | Giebels | G05B 13/02 700/105 |
| 2010/0063372 A1* | 3/2010 | Potts | A61B 5/14521 600/346 |
| 2010/0308171 A1* | 12/2010 | Kelley | B23P 19/04 244/132 |
| 2013/0060372 A1* | 3/2013 | Lokowandt | G06F 19/00 700/100 |
| 2013/0304239 A1* | 11/2013 | Turolla | G06Q 10/06 700/79 |
| 2015/0048068 A1* | 2/2015 | Matsushita | H01L 24/40 219/121.64 |
| 2015/0066432 A1* | 3/2015 | Lee | G06F 11/3072 702/185 |
| 2015/0112468 A1* | 4/2015 | Rudnick, III | G05B 19/4097 700/98 |
| 2016/0047220 A1* | 2/2016 | Sharp | G06Q 50/02 700/275 |
| 2016/0207202 A1 | 7/2016 | Lee et al. | |
| 2018/0150066 A1* | 5/2018 | Chen | G05B 19/41865 |
| 2018/0166370 A1* | 6/2018 | Lin | H05K 3/0047 |

FOREIGN PATENT DOCUMENTS

| | | |
|---|---|---|
| EP | 2161637 A1 | 3/2010 |
| EP | 2863280 A1 | 4/2015 |
| WO | 03058532 A1 | 7/2003 |
| WO | 2005022281 A2 | 3/2005 |

OTHER PUBLICATIONS

Extended European Patent Office Examination Report for Application No. 18 178 211.1-1222 dated Jan. 28, 2020.

European Patent Office Summons to Attend Oral Proceddings for Application No. 18 178 211.1222 dated Oct. 30, 2020.

Innovation, Science and Economic Development Canada Requisition by Examiner for Application No. 2997143 dated Mar. 12, 2021.

European Patent Office Preliminary Opinion for Application No. 18178211.1-1222/3418823 dated Jul. 6, 2021.

European Patent Office Decision to Refuse a European Patent Application for Application No. 18 178 211.1-1222 dated Jun. 21, 2021.

* cited by examiner

DYNAMIC MODIFICATION OF PRODUCTION PLANS RESPONSIVE TO MANUFACTURING DEVIATIONS

FIELD

The present disclosure relates generally to manufacturing, and more specifically, to techniques for dynamically modifying production plans responsive to manufacturing deviations.

BACKGROUND

Partially or fully-automated manufacturing processes have become common in numerous industries, such as the aerospace and automotive industries. These manufacturing processes may be relatively complex, often requiring the operation of multiple machine tools that may be arranged in a sequence of multiple stages. Within such a sequence of operations, individual operations are largely dependent on the result of previous operations. The dependency may be described as a "condition of assembly" that describes one or more expected characteristics of the assembly prior to performing a particular operation.

Deviations from the characteristics prescribed by a condition of assembly may occur for any number of reasons, such as the unavailability of parts, operator-introduced errors, and so forth. In some cases, accommodating these production deviations may require a revision of the production plan and/or reprogramming the automated machine tools, which may be costly in terms of labor and lost production. Further, such revisions may not always be feasible, and the production plan may instead be revised through administrative controls (e.g., using a memorandum that provides instructions to the operators).

No matter how the production deviations are accommodated, the resulting manufacturing process may still be sub-optimal. In one example, a revised production plan may introduce inefficiencies into the manufacturing process, e.g., by requiring further modifications to be made within other, downstream operations. In another example, a revised production plan can increase risk, such as an increased probability of operator errors and/or equipment errors.

SUMMARY

One embodiment provides a computer-implemented method usable during production of an assembly using at least a first machine tool. The method comprises retrieving a predetermined production plan for the assembly, wherein the predetermined production plan comprises a plurality of operations using the first machine tool. The method further comprises acquiring input data to determine a production deviation from the predetermined production plan. The method further comprises determining, responsive to determining the production deviation, a modified production plan for the assembly by substituting one or more substitute operations for one or more of the plurality of operations of the predetermined production plan. The method further comprises transmitting instructions to the first machine tool corresponding to the one or more substitute operations of the modified production plan.

Another embodiment provides a computer-implemented method usable during production of an assembly using a plurality of machine tools. The method comprises transmitting, to a first machine tool of the plurality of machine tools, first instructions corresponding to a predetermined production plan for the assembly, wherein the predetermined production plan comprises a plurality of operations. The method further comprises updating a deviation map responsive to receiving location information that identifies a location of a production deviation from the production plan. The method further comprises determining, using the deviation map, a modified production plan having one or more substitute operations that are substituted for one or more of the plurality of operations of the predetermined production plan. The method further comprises transmitting, to the first machine tool or to a second machine tool of the plurality of machine tools, second instructions comprising the one or more substitute operations.

Another embodiment provides a system comprising at least a first machine tool, and one or more computer processors communicatively coupled with the first machine tool. The one or more computer processors are configured to transmit, to the first machine tool, first instructions corresponding to a predetermined production plan for an assembly to be produced, wherein the predetermined production plan comprises a plurality of operations. The one or more computer processors are further configured to update a deviation map responsive to receiving location information that identifies a location of a production deviation from the production plan. The one or more computer processors are further configured to determine, using the deviation map, a modified production plan having one or more substitute operations that are substituted for one or more of the plurality of operations of the predetermined production plan. The one or more computer processors are further configured to transmit, to the first machine tool or to a second machine tool, second instructions comprising the one or more substitute operations.

The features, functions, and advantages that have been discussed may be achieved independently in various embodiments or may be combined in yet other embodiments, further details of which can be seen with reference to the following description and drawings.

BRIEF DESCRIPTION OF ILLUSTRATIONS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
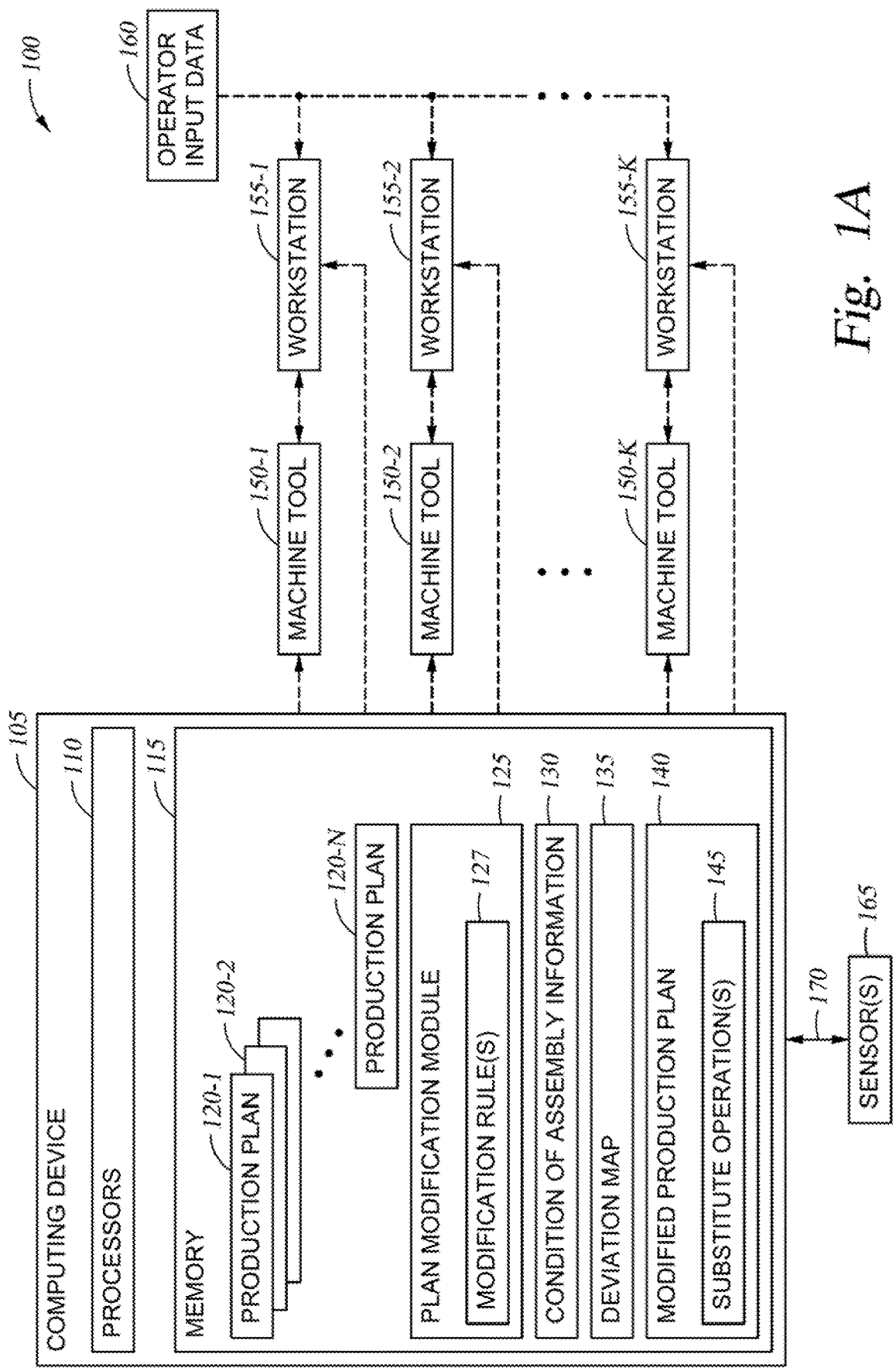
FIG. 1A illustrates an exemplary system for modifying production plans, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

According to techniques disclosed herein, a computer-based system may accommodate production deviations by substituting one or more substitute operations for one or more operations of a predetermined production plan. The computer-based system may acquire input data, e.g., from sensor data and/or an operator input data, to determine that a production deviation has occurred from a predetermined production plan. The computer-based system may determine a modified production plan responsive to the production deviation, where the modified production plan includes the one or more substitute operations.

Referring to FIG. 1A, an exemplary system 100 for modifying production plans comprises a computing device 105 that is communicatively coupled with a plurality of machine tools 150-1, 150-2, . . . , 150-K (generically referred to as a machine tool 150), with a plurality of workstations 155-1, 155-2, . . . , 155-K (generically referred to as a workstation 155), and with one or more sensors 165. Each individual machine tool 150 may be separate or may be integrated with one or more other machine tools 150 into a single cell. Each machine tool 150 may be partially or fully automated, that is, capable of performing production operation(s) at least partly independently of a human operator. In some embodiments, each machine tool 150 is controlled via computer numerical control (CNC). In the context of aerospace or automotive manufacturing, some non-limiting examples of machine tools 150 include a drilling machine tool, a welding machine tool, a riveting machine tool, and so forth. However, the techniques discussed herein may be applied to any other suitable type(s) of machine tools, such as laser or plasma cutting tools, bending tools, hole-punching tools, routing tools, sawing tools, and so forth.

Each workstation 155 may be implemented as a computing device that is configured to display information related to the production operation(s) performed by the associated machine tool 150. Each workstation 155 may be further configured to receive operator input data 160 from an operator related to the production operation(s), e.g., using a human-machine interface (HMI). For example, the operator input data 160 to the workstation 155 may pause or halt an automated production operation being performed by the corresponding machine tool 150 to allow an operator to intervene. Further, while the machine tools 150 and workstations 155 are shown as corresponding in a 1:1 ratio, other arrangements are also possible. For example, a particular machine tool 150 may not have a corresponding workstation 155, one workstation 155 may correspond to multiple machine tools 150, and so forth.

The one or more sensors 165 are generally directed toward one or more machine tools 150 and/or the assembly (or sub-assembly) that is being produced using the one or more machine tools 150. The one or more sensors 165 are configured to provide sensor data 170 to the computing device 105 that indicates a condition of the assembly (e.g., as condition of assembly (COA) information 130) and/or a condition of the machine tools 150. The one or more sensors 165 may have any suitable type(s), such as optical sensors, proximity sensors, thermal sensors, and so forth. For example, an optical sensor may be used to acquire imagery that includes the assembly, and the computing device 105 performs one or more image analysis operations on the acquired imagery to determine the COA information 130. The COA information 130 and/or a condition of the machine tools 150 may be used to determine whether the production plan 120 should be modified by the plan modification module 125.

The computing device 105 may be embodied in any suitable form. In one embodiment, the computing device is a program server that is communicatively coupled with the workstations 155. The computing device 105 comprises one or more computer processors 110 and a memory 115. The one or more computer processors 110 generally include any processing elements capable of performing various functions described herein. While depicted as a single element within the computing device 105, the one or more computer processors 110 are intended to represent a single processor, multiple processors, a processor or processors having multiple cores, as well as combinations thereof. The memory 115 may include a variety of computer-readable media selected for relative performance or other capabilities: volatile and/or non-volatile media, removable and/or non-removable media, etc. The memory 115 may include cache, random access memory (RAM), storage, etc. Storage included in the memory 115 typically provides a non-volatile memory for the computing device 105, and may include one or more different storage elements such as Flash memory, a hard disk drive, a solid state drive, an optical storage device, and/or a magnetic storage device.

Figure 1B:
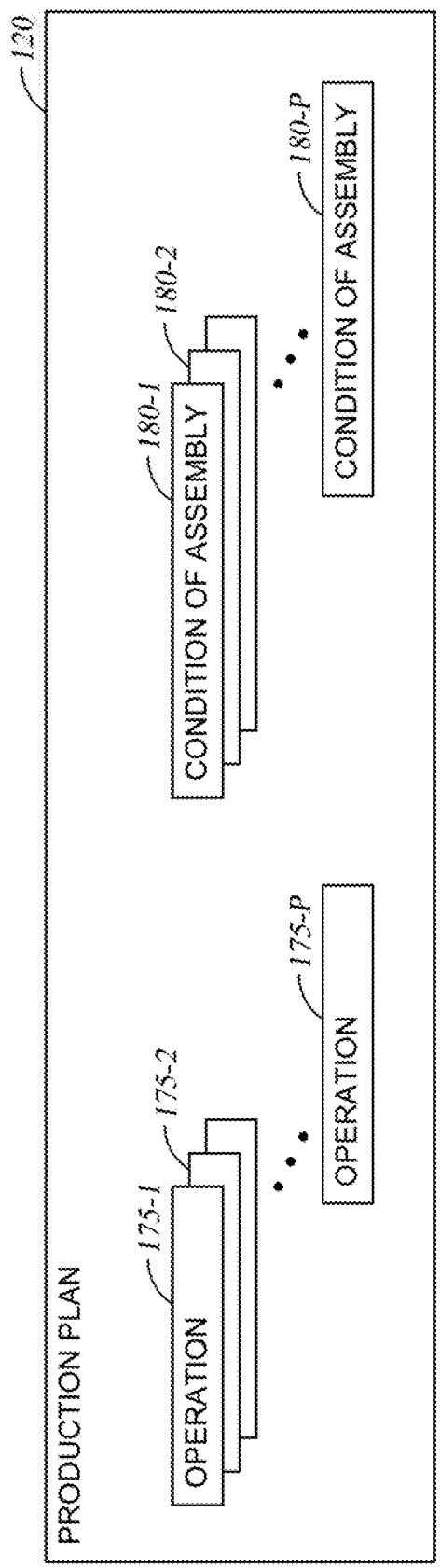
FIG. 1B illustrates an exemplary production plan, according to one embodiment.

The memory 115 stores a plurality of predetermined production plans 120-1, . . . , 120-N (generically referred to as a production plan 120), each of which may be used to produce a corresponding assembly (or a sub-assembly) using one or more machine tools 150. As shown in FIG. 1B, each production plan 120 comprises a plurality of operations 175-1, 175-2, . . . , 175-P (generically referred to as an operation 175) that are communicated to the one or more machine tools 150 to produce the assembly or sub-assembly. Each operation 175-1, 175-2, . . . , 175-P corresponds to a respective COA 180-1, . . . , 180-P (generically referred to as a COA 180) that prescribes one or more preconditions to be met prior to performing the corresponding operation 175. In some embodiments, a particular operation 175 will not proceed unless the corresponding COA 180 has been verified, e.g., using the COA information 130.

Each production plan 120 may be produced using computer-aided manufacturing (CAM) software, and the computing device 105 and/or workstation 155 translates the operations 175 of the production plan 120 into machine commands that are suitable for execution by the machine tools 150. The machine commands may have any suitable formatting, such as G-code (also referred to as "RS-274") instructions, Extensible Markup Language (XML), and/or proprietary numerical control (NC) programming language instructions. In this way, the plurality of machine tools 150 may be reconfigured to produce different types of assemblies, based on which production plan 120 has been selected.

The memory 115 further comprises a plan modification module 125 that is configured to generate a modified production plan 140 from a particular production plan 120. As discussed above, the plan modification module 125 may generate the modified production plan 140 responsive to acquired input data, such as the sensor data 170 indicating the condition of assembly (COA) information 130 and/or a condition of the machine tools 150. In some embodiments, the computing device 105 determines that a production deviation has occurred when the COA information 130 does not match the COA 180 for a particular operation 175. The input data may alternately be provided as operator input data 160. In one example, an operator visually inspecting the assembly during its production may provide, via a workstation 155, operator input data 160 that indicates the presence of a production deviation from the production plan 120. In another example, the condition of a machine tool 150 is such that the machine tool 150 cannot complete one or more operations 175 of the production plan 120. In yet another example, the production deviation may be determined using input data that indicates an unavailability of a part specified by the production plan 120.

When the input data indicates that a production deviation has occurred from the production plan 120, the plan modification module 125 generates the modified production plan 140 by substituting one or more substitute operations 145 for one or more of the plurality of operations 175 of the production plan 120. In some embodiments, a particular operation 175 comprises a plurality of predefined steps that are performed by one or more machine tools 150, and a substitute operation 145 comprises fewer than all of the plurality of predefined steps. Stated another way, the substitute operation 145 may omit one or more steps included in the operation 175. In other embodiments, a substitute operation 145 may include one or more steps that are altered from steps of the operation 175. In some cases, the substitute operation 145 may further include one or more other steps that are not included in the original operation 175.

In some embodiments, the plan modification module 125 access one or more predetermined modification rules 127 when determining a substitute operation 145 from an operation 175. The modification rules 127 may reflect any suitable production and/or safety-based considerations. The modification rules 127 may be specified as operator input data 160, but this is not a requirement. In one non-limiting example, a production plan 120 specifies an installation of a plurality of permanent fasteners in a workpiece. The production plan 120 defines a sequence in which another operation 175 is specified for drilling pilot holes before installing the plurality of permanent fasteners. The production plan 120 may further specify intermediate operations 175, such as forming temporary fasteners (such as a tack weld) and removing the temporary fasteners before installing the plurality of permanent fasteners. Continuing the example, a modification rule 127 defines which operation(s) 175 may be suitable as substitute operation(s) 145 for a particular operation 175. For example, if the production plan 120 includes an operation 175 that specifies installing a permanent fastener at a particular location, a modification rule 127 may permit a pilot hole, a temporary fastener, or removing the temporary fastener at the location to be a substitute operation 145. However, if the production plan 120 includes another operation 175 that specifies installing a temporary fastener, the modification rule 127 may permit a pilot hole but does not permit installation of a temporary fastener or a permanent fastener to be a substitute operation 145. Other modification rules 127 are also possible.

In one non-limiting example, the production plan 120 corresponds to a first distribution of a plurality of fasteners to be installed in a workpiece. Responsive to determining a production deviation, the modified production plan 140 is determined by the plan modification module 125 to correspond to a different, second distribution of a plurality of fasteners to be installed in the workpiece. In such an example, the predefined steps of a corresponding operation 175 may correspond to installation of each individual fastener at a respective location in the workpiece. The substitute operation 145 may omit one or more of the predefined steps (e.g., not installing a fastener at a particular location), alter one or more of the predefined steps (e.g., altering a location for installing a fastener), and so forth.

A non-limiting example of the use of substitute operations 145 is illustrated with respect to Tables 1 and 2. In the example modified production plan 140, the substitute operation 145 comprises drilling pilot holes at a plurality of locations, which is done as a substitute for drilling a plurality of locations and installing fasteners at the plurality of locations.

TABLE 1

Example production plan 120

```
Begin
    Initial Part Probe (global indexing)    // referenced to one or more parts of the assembly
    For local sync locations S = 1, n       // a plurality of local sync locations along the assembly
        sync @ location S
        For adjacent locations A = 1, m     // each local sync location has one or more adjacent locations
            drill location A                // replaced operation 1
            install fastener at location A  // replaced operation 2
        Next
    Next
End
```

TABLE 2

Example modified production plan 140

```
Begin
    Initial Part Probe (global indexing)
    For local sync locations S = 1, n
        sync @ location S
        For adjacent locations A = 1, m
            pilot drill location A          // substitute operation 145
        Next
    Next
End
```

As discussed above, the various operations 175 of the production plan 120 are often closely interrelated. More specifically, the completion of one operation 175 may correspond to a COA 180 that is needed for a subsequent operation 175. In this way, changes to an upstream operation 175 can have an effect on one or more downstream operations 175. For example, if a pilot hole is not drilled at a particular location as part of an upstream operation 175, a fastener may not be installed at that location as part of a downstream operation 175.

To provide a continuous tracking of production deviations across the various operations 175 of the production plan 120, the plan modification module 125 (or another suitable portion of the computing device 105) may be further configured to generate and maintain a deviation map 135 that includes information relating to the identified production deviations. In one embodiment, the plan modification module 125 generates an identification code for each identified production deviation. The identification code may be unique for each production deviation. In some embodiments, the identification code for a production deviation comprises type information and location information. The plant modification module 125 may update the deviation map 135 using each generated identification code, and may determine the one or more substitute operations 145 using the deviation map 135.

In one embodiment, the plan modification module 125 may be configured to generate a modified production plan 140 that enables randomized operations. For example, say a production plan 120 includes an operation 175 specifying a complete inspection of a plurality of holes that are formed in a workpiece before installing temporary fasteners or permanent fasteners. The plan modification module 125 may generate a modified production plan 140 that enables a partial, randomized inspection of the plurality of holes. For those holes that are not subject to the partial, randomized inspection, the modified production plan 140 may include substitute operations 145 in which temporary fasteners or permanent fasteners are installed. This can be beneficial to streamline the production of the assembly, as the scope of the intermediate inspection operation is reduced.

Figure 2:
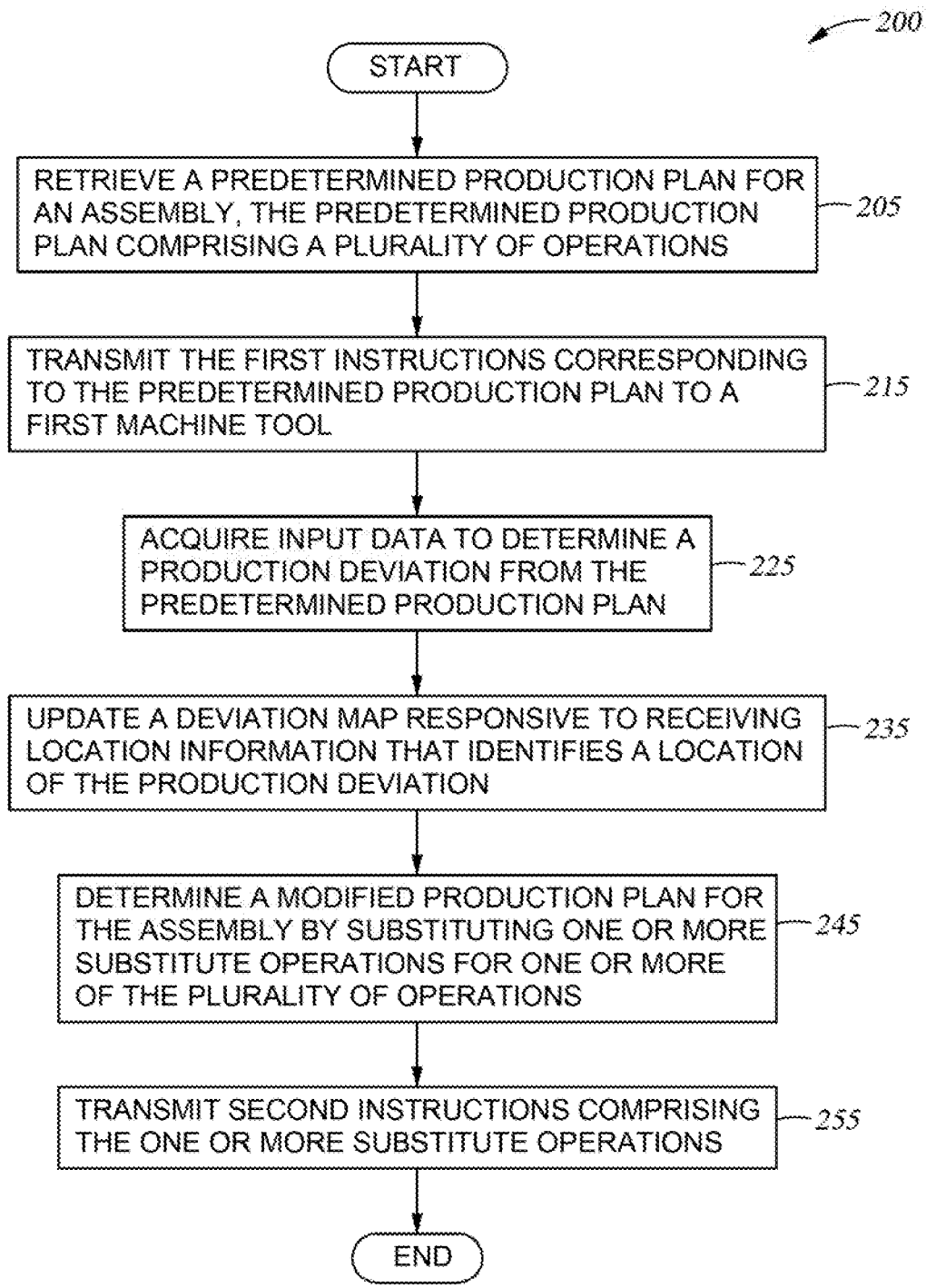
FIG. 2 is an exemplary method usable during production of an assembly using at least a first automated machine tool according to one embodiment.
Figure 3A:
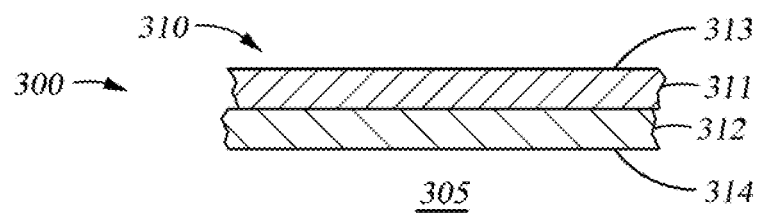
FIGS. 3A-3F illustrate an exemplary sequence of operations for installing a fastener in an assembly, according to one embodiment.
Figure 3B:
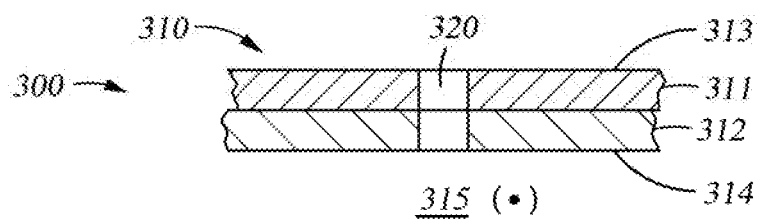
Figure 3C:
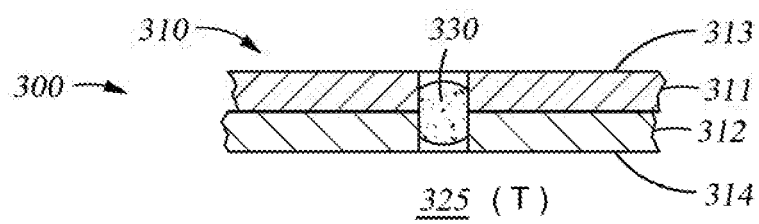
Figure 3D:
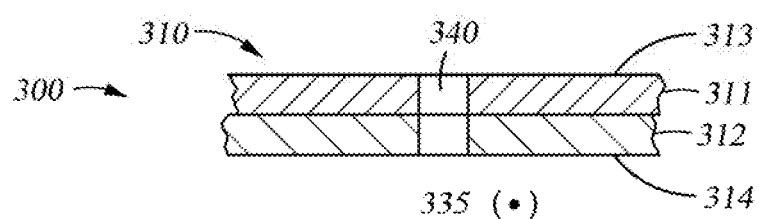
Figure 3E:
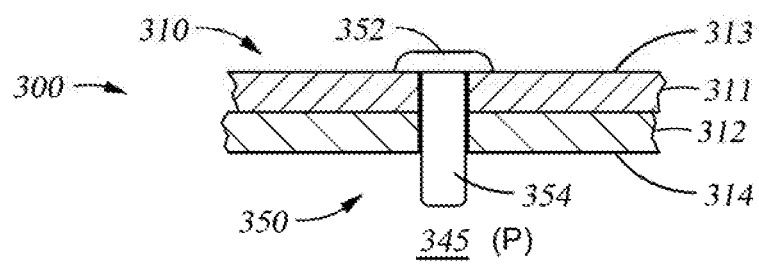
Figure 3F:
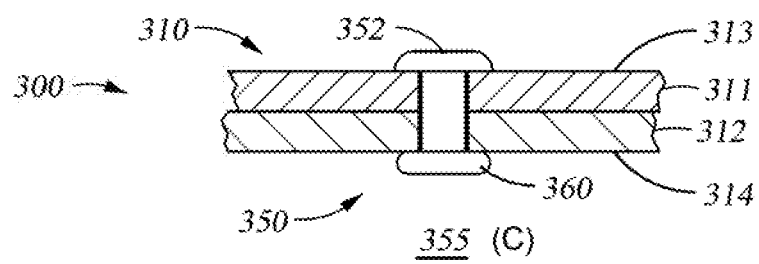

FIG. 2 illustrates an exemplary method 200 that is usable during production of an assembly using at least a first machine tool, according to embodiments disclosed herein. Method 200 may be used in conjunction with other embodiments discussed herein. For example, the method 200 may be performed using the plan modification module 125 of the computing device 105 depicted in FIG. 1A.

Method 200 begins at block 205, where the computing device retrieves a predetermined production plan for an assembly. The predetermined production plan comprises a plurality of operations that are to be performed using one or more machine tools communicatively coupled with the computing device. At block 215, first instructions are transmitted to a first machine tool corresponding to the production plan. In some embodiments, the computing device translates the operations of the production plan into machine commands that are suitable for execution by the one or more machine tools. In other embodiments, the computing device transmits the operations to one or more workstations associated with the one or more machine tools, and the one or more workstations perform the translation to suitable machine commands.

At block 225, the computing device acquires input data to determine a production deviation from the predetermined production plan. In some embodiments, the input data comprises sensor data, e.g., acquired using a visual sensor that is directed toward the assembly. In other embodiments, the input data comprises operator input data. In yet other embodiments, the input data indicates an unavailability of a part specified by the production plan. Determining a production deviation may be performed by comparing COA information (which may be derived from the sensor data and/or the operator input data) with a COA specified in the production plan.

At block 235, the computing device updates a deviation map responsive to receiving location information that identifies a location of the production deviation. The location information may be included in a (unique) identification code generated for the production deviation.

At block 245, the computing device determines a modified production plan for the assembly by substituting one or more substitute operations for one or more of the plurality of operations of the production plan. At block 255, second instructions are transmitted to one or more machine tools that comprise the one or more substitute operations. The second instructions may be transmitted to the first machine tool and/or to a second machine tool. Method 200 ends following completion of block 255.

FIGS. 3A-3F illustrate an exemplary sequence 300 of operations for installing a fastener in an assembly 310, according to one embodiment. The assembly 310 may represent a skin assembly for an aircraft fuselage, but this is not a requirement. The sequence 300 may be performed in conjunction with other embodiments discussed herein, such as using one or more machine tools 150 depicted in FIG. 1A.

View 305 depicts a first state for the assembly 310, which may follow an operation where a first workpiece 311 and a second workpiece 312 are positioned using a machine tool to have a desired overlap. The first workpiece 311 defines a first surface 313 and the second workpiece 312 defines an opposing second surface 314.

View 315 depicts a second state of the assembly 310, in which the assembly 310 defines a cavity 320 that extends between the first surface 313 and the second surface 314. In some embodiments, the view 315 may follow an operation in which the cavity 320 is formed through the assembly 310 using a drilling machine tool. In subsequent figures, the second state having the cavity 320 is represented by a bullet symbol (•).

View 325 depicts a third state of the assembly 310, in which a temporary fastener 330 has been formed at the cavity 320. In some embodiments, the temporary fastener 330 comprises a tack fastener (or "tack weld") applied using a welding machine tool. Other types of temporary fasteners are also possible. In subsequent figures, the third state having the temporary fastener 330 is represented by the letter T.

View 335 depicts a fourth state of the assembly 310, in which a cavity 340 is formed through the assembly 310. The cavity 340 may be formed by drilling out the temporary fastener 330. The cavity 340 may have substantially a same sizing as the cavity 320, but this is not a requirement. In some alternate embodiments, a temporary fastener 330 is not used, and the sequence 300 may progress directly from view 315 to view 345. In subsequent figures, the fourth state having the cavity 340 is also represented by a bullet symbol (•).

View 345 depicts a fifth state of the assembly 310, in which a permanent fastener 350 installed through the cavity 320 (or cavity 340). In some embodiments, the permanent fastener 350 comprises a rivet having a shank 354 that extends through the assembly 310, and a head 352 that does not extend through the assembly 310. In some cases, the head 352 contacts the first surface 313, but this is not a requirement. In subsequent figures, the fifth state having the permanent fastener 350 is represented by the letter P.

View 355 depicts a sixth state of the assembly 310, in which a collar 360 is attached to the permanent fastener 350. In subsequent figures, the sixth state having the collared permanent fastener 350 is represented by the letter C. Although six states of the assembly 310 are shown in the sequence 300, alternate implementations may have a different number of states.

Figure 4:
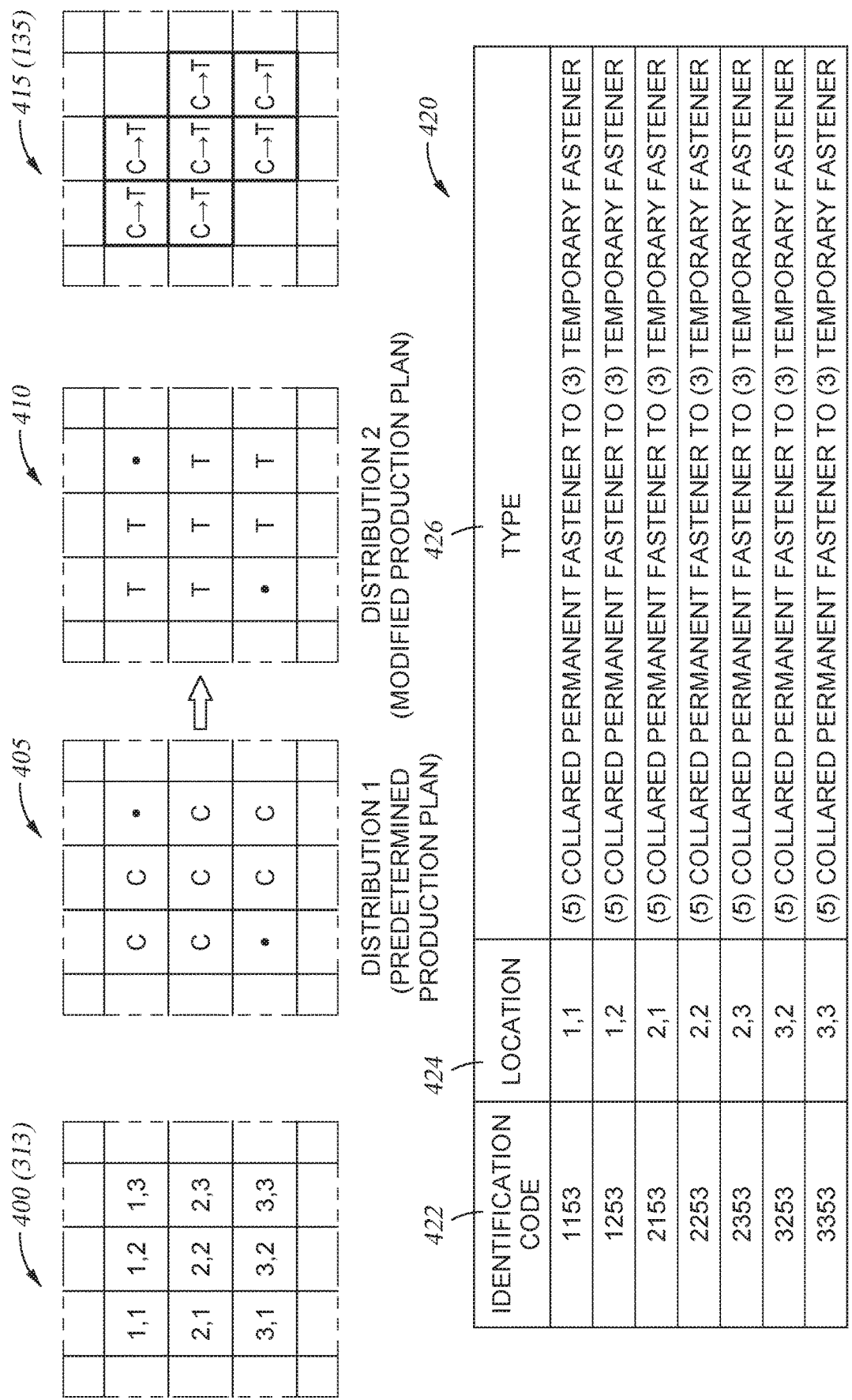
FIG. 4 illustrates a modified production plan produced using a deviation map, according to one embodiment.

FIG. 4 illustrates a modified production plan produced using a deviation map, according to one embodiment. The modified production plan may be determined in conjunction with other embodiments discussed herein, such as using the plan modification module 125 of the computing device 105 depicted in FIG. 1A.

Diagram 400 illustrates a 3×3 rectangular array of predefined locations relative to an assembly, such as relative to the first surface 313 of a workpiece included in the assembly. The predefined locations have coordinates (1,1), (1,2), (1,3), (2,1), (2,2), (2,3), (3,1), (3,2), and (3,3).

Diagram 405 illustrates a first distribution (Distribution 1) of a plurality of fasteners according to the predetermined production plan. Within diagram 405, a collared permanent fastener (each indicated by the letter "C") should be included at each of coordinates (1,1), (1,2), (2,1), (2,2), (2,3), (3,2), and (3,3). The production plan further specifies that pilot holes should be drilled at coordinates (1,3) and (3,1). For example, the locations corresponding to the pilot holes may be left without temporary fasteners or permanent fasteners such that the pilot holes may be inspected according to a partial, randomized inspection.

Diagram 410 illustrates a second distribution (Distribution 2) of a plurality of fasteners according to a modified production plan. As discussed above, the modified production plan may be determined responsive to determining a production deviation. For example, the production deviation may be determined based on an unavailability of permanent fasteners and/or collars. In another example, the production deviation may be determined based on detecting that a temporary fastener was installed in a location that was not specified by the production plan. In the second distribution of diagram 410, temporary fasteners (each indicated by the letter "T") are substituted for each of the collared permanent fasteners of the first distribution.

The differences between the first distribution and the second distribution may be reflected in a deviation map 135 illustrated in diagram 415. For each of the substituted locations—coordinates (1,1), (1,2), (2,1), (2,2), (2,3), (3,2), and (3,3)—the deviation map 135 indicates a change from a collared permanent fastener to a temporary fastener (that is, C→T). These differences between the first distribution and the second distribution may additionally or alternately be stored in a deviation table 420.

Each production deviation of the deviation table 420 may be assigned a distinct identification code 422. In some embodiments, the identification code 422 is based on one or both of location information 424 and type information 426. The location information 424 represents the location of the production deviation within the assembly. The type information 426 represents a particular type of a predetermined plurality of deviation types.

As shown, a first production deviation occurring at coordinate (1,1) is assigned an identification code 422 (1153). The type information 426 indicates the expected part or state at the coordinate (1,1) and the substitute part or state according to the modified production plan. For the first production deviation, a collared permanent fastener with an assigned value of "5" has been substituted with a temporary fastener having an assigned value of "3". The other production deviations correspond to identification codes 422 of 1253, 2153, 2253, 2353, 3253, 3353. While the identification codes 422 as shown concatenates the location information 424 and type information 426, other combinations of the different information are also possible. Further, while a simplified example is provided, other information may alternately be included within the identification code 422, such as an identity of the machine tool at which the deviation has occurred, the process information, and so forth.

Figure 5:
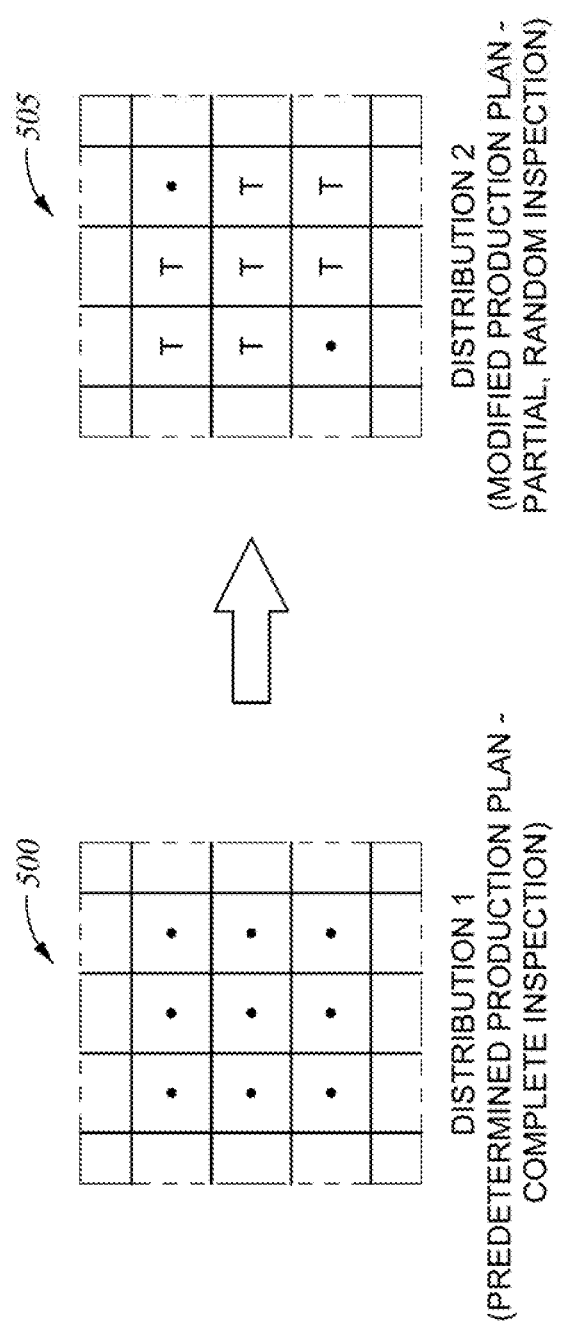
FIG. 5 illustrates a modified production plan to enable a partial inspection of an assembly during production, according to one embodiment.

FIG. 5 illustrates a modified production plan to enable a partial inspection of an assembly during production, according to one embodiment. The modified production plan may be determined in conjunction with other embodiments discussed herein, such as using the plan modification module 125 of the computing device 105 depicted in FIG. 1A.

Diagram 500 illustrates a first distribution according to a predetermined production plan. More specifically, the predetermined production plan specifies pilot holes at each of the coordinates to allow a complete inspection of the pilot holes prior to installing temporary fasteners or permanent fasteners. However, to streamline the inspection and overall production, only a statistically significant number of the pilot holes need be inspected. As shown, diagram 505 represents a second distribution according to a modified production plan that specifies pilot holes at coordinates (1,3) and (3,1). The modified production plan further specifies temporary fasteners at the other coordinates. In this way, the modified production plan enables a partial, randomized inspection of the plurality of pilot holes.

Figure 6:
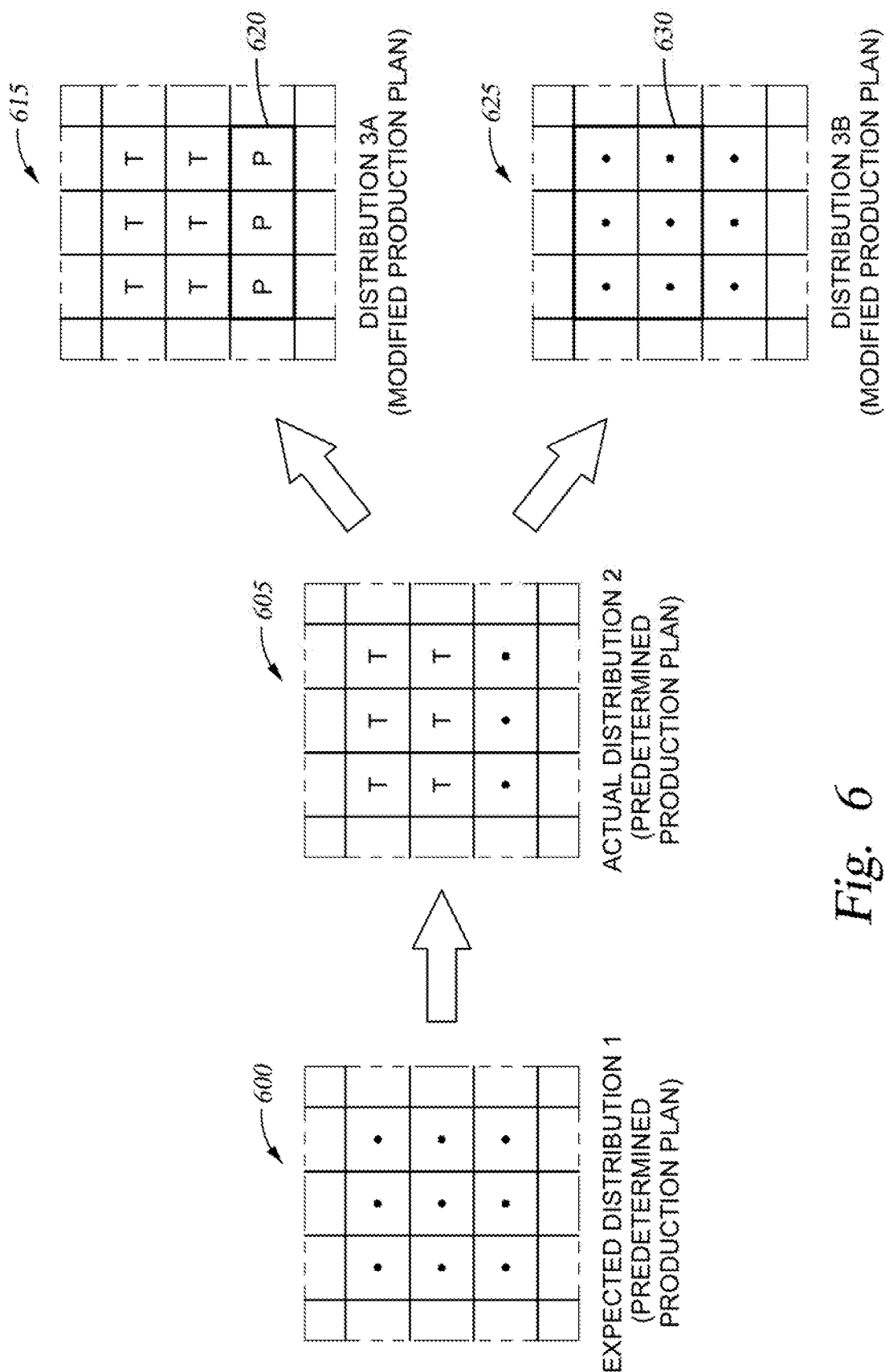
FIG. 6 illustrates modified production plans based on an expected distribution of fasteners in an assembly, according to one embodiment.

FIG. 6 illustrates modified production plans based on an expected distribution of fasteners in an assembly, according to one embodiment. The modified production plans may be determined in conjunction with other embodiments discussed herein, such as using the plan modification module 125 of the computing device 105 depicted in FIG. 1A.

Diagram 600 illustrates an expected distribution for a particular operation (i.e., how the assembly is expected to appear). In some embodiments, an expected distribution may be reflected in a COA corresponding to the operation. Here, the expected distribution specifies pilot holes for each of the coordinates (1,1)-(3,3). Diagram 605 illustrates an actual distribution, which may be sensed via one or more sensors or detected by an operator. The actual distribution has production deviations for each of the coordinates (1,1)-(2,3), where temporary fasteners have been installed where pilot holes were expected.

The plan modification module may determine multiple possible modified production plans and select one. Diagram 615 illustrates a distribution 3A according to a first modified production plan, in which permanent fasteners are installed in the pilot holes at coordinates (3,1)-(3,3) (highlighted within region 620). Diagram 625 illustrates a distribution 3B according to a second modified production plan, in which the temporary fasteners at coordinates (1,1)-(2,3) are drilled out (highlighted within region 630). The selection between different modified production plans may be based on any suitable factors, such as scheduled operations within the production plan, the availability of machine tools, and so forth.

Thus, embodiments disclosed herein are directed to a system and method for controlling a machine tool that permits simple modification of the operation of a part-specific NC program to accommodate deviations from plan caused by non-conformance items, random inspection plans, and other factors. The system may comprise a NC program server that is (a) configured to host a baseline part specific NC program for download to a machine tool workstation and (b) configured with a program for preparation of a machine readable step/substitute file that identifies steps within the baseline part-specific NC program that will be replaced with substitute steps and identifies the corresponding substitute operations. The system may further comprise a machine tool workstation attached to an NC machine tool, in signal communication with the NC program server. The machine tool workstation may be configured to (a) request and receive the baseline part specific NC program from the NC program server, (b) request and receive a part specific step/substitute file from the NC program server, and (c) determine if substitutions are required, by inspecting the part specific step/substitution file.

When no substitutions are required, the machine tool workstation may (a) transfer the baseline part specific NC program to the NC machine tool, and (b) direct the NC machine tool to run the part specific NC program. However, when substitutions are required, the machine tool workstation may modify the baseline part specific NC program by:
  i) Iterating through the part specific step/substitute file,
  ii) For each step in the step/substitute file
    (1) Locate the corresponding step in the baseline part specific NC program
    (2) Replace the corresponding step in the baseline part specific NC program with the substitute identified in the step/substitute file
    (3) Transfer the modified part specific NC program to the NC machine tool
    (4) Direct the NC Machine tool to run the modified part specific NC program and to record the status of each substitute step in a part specific completion file in non-volatile memory of the machine too.
    (5) When the machine tool completes execution
    (6) Retrieve the part specific completion file from the non-volatile memory of the NC machine tool.
    (7) Store the part specific completion file on the NC program file server, to be used for post-processing inspections.

In some embodiments, the system determines a production deviation for an upstream operation, extracts a deviation list reflecting the determined production deviation and any other production deviations, and passes the deviation list to a machine tool workstation. The machine tool workstation processes the production deviation(s), and the system extracts a deviation report from a machine database, and links the deviation report to state manufacturing deviation plans.

In one exemplary sequence, the sequence begins with a substitutions file uploaded to a server. When a program is requested from an operator PC, the program request is received at the server. Responsive to the program request, the program is downloaded onto the data PC and the substitutions file is requested and received by the data PC. The data PC compares the program and the substitutions file. If no substitutions are required for the program, the baseline process is transferred to (and executed using) the NC machine.

If any substitutions are required, the data PC identifies one or more steps requiring substitutions. The data PC itemizes steps requiring substitutions and the substitute operations, such as substituting all fastener full installations for pilot-only operations for a missing frame. The data PC transfers the substitutions to the NC machine, which executes the program with substitutions. The processed substitutions are recorded with a unique status code in the machine database. A substitutions report is generated which includes the status code, which may be used for tracking the substitutions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method usable during production of an assembly using at least a first machine tool, the method comprising:
    retrieving a predetermined production plan for the assembly, wherein the predetermined production plan comprises a plurality of operations using the first machine tool, wherein the predetermined production plan corresponds to a first distribution of a plurality of fasteners to be installed in a workpiece;
    acquiring input data to determine a production deviation from the predetermined production plan, wherein the production deviation comprises one of: an unavailability of the fasteners, or a part installed in the workpiece at a location not specified by the predetermined production plan;
    responsive to determining the production deviation, modifying the first distribution of the plurality of fasteners to a different, second distribution of a plurality of fasteners to be installed in the workpiece, wherein modifying the first distribution comprises substituting one or more substitute operations for one or more of the plurality of operations of the predetermined production plan to produce a modified production plan; and
    transmitting instructions to the first machine tool corresponding to the one or more substitute operations of the modified production plan to control the first machine tool using a numerical controller to install the different, second distribution of the plurality of fasteners at modified locations.

2. The method of claim 1, wherein the first distribution includes a substantially permanent fastener at a predetermined location of the workpiece, and
    wherein the second distribution includes a temporary fastener at the predetermined location.

3. The method of claim 1, wherein the plurality of operations using the first machine tool comprises installing a plurality of fasteners in a workpiece,
    wherein installation of an individual fastener of the plurality of fasteners corresponds to a first operation of the plurality of operations, wherein the first operation comprises a plurality of predefined steps, and
    wherein a first substitute operation is substituted for the first operation, wherein the first substitute operation comprises fewer than all of the plurality of predefined steps.

4. The method of claim 3, wherein the plurality of predefined steps comprises two or more of: drilling a pilot hole for the individual fastener in the workpiece, applying a temporary fastener in the workpiece at a location for the individual fastener, drilling out the temporary fastener, installing a permanent fastener in the workpiece, and installing a collar for the permanent fastener.

5. The method of claim 1, wherein the input data comprises one of sensor data acquired from a sensor directed toward the assembly, and operator input data.

6. The method of claim 1, further comprising:
    generating an identification code that identifies a type of the production deviation and a location of the production deviation in the assembly.

7. The method of claim 6, further comprising:
updating a deviation map using the identification code; and
determining the one or more substitute operations using the deviation map.

8. The method of claim 1, further comprising:
applying a predefined modification rule to determine the one or more substitute operations.

9. The method of claim 1, wherein the plurality of operations of the predetermined production plan corresponds to performing a same operation at a plurality of locations in the assembly, and
wherein determining the modified production plan comprises performing the same operation at fewer than all of the plurality of locations.

10. The method of claim 9, wherein the same operation comprises a drilling operation to form a hole in a workpiece,
wherein the predetermined production plan enables a complete inspection of a plurality of holes formed in the workpiece, and
wherein the modified production plan enables a partial, randomized inspection of the plurality of holes.

11. A computer-implemented method usable during production of an assembly using one or more machine tools, the method comprising:
transmitting, to a first machine tool of the one or more machine tools, first instructions corresponding to a predetermined production plan for the assembly, wherein the predetermined production plan comprises a plurality of operations for a plurality of locations corresponding to cavities extending through a workpiece of the assembly, wherein the predetermined production plan corresponds to a first distribution of a plurality of fasteners to be installed in the workpiece, wherein the first machine tool is one of a drilling machine tool, a welding machine tool, and a riveting machine tool;
updating a deviation map responsive to receiving location information that identifies a first location of the plurality of locations having a production deviation from the production plan, wherein the production deviation comprises one of: an unavailibility of the fasteners, or a part installed in the workpiece at the first location that is not specified by the predetermined production plan;
using the updated deviation map, modifying the first distribution of the plurality of fasteners to a different, second distribution of a plurality of fasteners to be installed in the workpiece, wherein modifying the first distribution comprises substituting one or more substitute operations that are substituted for one or more of the plurality of operations of the predetermined production plan to produce a modified production plan, wherein the one or more substitute operations are of a different type than the one or more of the plurality of operations; and
transmitting, to the first machine tool or to a second machine tool of the one or more machine tools, second instructions comprising the one or more substitute operations to control the first machine tool or the second machine tool using a numerical controller to install the different, second distribution of the plurality of fasteners at modified locations.

12. The method of claim 11, wherein the first distribution includes a substantially permanent fastener at a predetermined location of the workpiece, and
wherein the second distribution includes a temporary fastener at the predetermined location.

13. The method of claim 11, wherein the plurality of operations of the predetermined production plan corresponds to performing a same operation at a plurality of locations in the assembly, and
wherein determining the modified production plan comprises performing the same operation at fewer than all of the plurality of locations.

14. A system comprising:
at least a first machine tool; and
one or more computer processors communicatively coupled with the first machine tool and configured to:
transmit, to the first machine tool, first instructions corresponding to a predetermined production plan for an assembly to be produced, wherein the predetermined production plan comprises a plurality of operations for a plurality of locations corresponding to cavities extending through a workpiece of the assembly, wherein the predetermined production plan corresponds to a first distribution of a plurality of fasteners to be installed in the workpiece;
update a deviation map responsive to receiving location information that identifies a first location of the plurality of locations having a production deviation from the production plan, wherein the production deviation comprises one of: an unavailibility of the fasteners, or a part installed in the workpiece at the first location that is not specified by the predetermined production plan;
using the updated deviation map, modify the first distribution of the plurality of fasteners to a different, second distribution of a plurality of fasteners to be installed in the workpiece, wherein modifying the first distribution comprises substituting one or more substitute operations for one or more of the plurality of operations of the predetermined production plan to produce a modified production plan, wherein the one or more substitute operations are of a different type than the one or more of the plurality of operations; and
transmit, to the first machine tool or to a second machine tool, second instructions comprising the one or more substitute operations to control the first machine tool or the second machine tool using a numerical controller to install the different, second distribution of the plurality of fasteners at modified locations,
wherein the first machine tool is one of a drilling machine tool, a welding machine tool, and a riveting machine tool.

15. The system of claim 14, wherein the first distribution includes a substantially permanent fastener at a predetermined location of the workpiece, and
wherein the second distribution includes a temporary fastener at the predetermined location.

16. The system of claim 14, wherein the plurality of operations of the predetermined production plan corresponds to performing a same operation at a plurality of locations in the assembly, and
wherein determining the modified production plan comprises performing the same operation at fewer than all of the plurality of locations.

17. The method of claim 11, wherein the first machine tool is a riveting machine tool, and wherein the second machine tool is a welding machine tool.

18. The method of claim 11, further comprising:
applying a predefined modification rule to determine the one or more substitute operations.

19. The method of claim 11, further comprising:
acquiring input data to determine the production deviation from the predetermined production plan, wherein the input data comprises one of sensor data acquired from a sensor directed toward the assembly, and operator input data.

20. The system of claim 14, wherein the one or more computer processors are further configured to:
apply a predefined modification rule to determine the one or more substitute operations.

* * * * *